United States Patent
Sharma et al.

(12)
(10) Patent No.: US 6,225,381 B1
(45) Date of Patent: May 1, 2001

(54) PHOTOGRAPHIC QUALITY INKJET PRINTABLE COATING

(75) Inventors: Jyoti Sharma, Bedminster, NJ (US); David James Gibboni, Havertown, PA (US); Elizabeth Joyce Lanigan, Trenton, NJ (US)

(73) Assignee: AlliedSignal Inc., Morris Township, NJ (US)

( * ) Notice: Subject to any disclaimer, the term of this patent is extended or adjusted under 35 U.S.C. 154(b) by 0 days.

(21) Appl. No.: 09/289,688

(22) Filed: Apr. 9, 1999

(51) Int. Cl.$^7$ ............... C08J 3/00; C08K 3/20; C08K 3/00; C08L 75/00; C08L 1/00

(52) U.S. Cl. ............... 524/35; 524/13; 524/31; 524/32; 524/35; 524/37; 524/40; 524/42; 524/50; 524/51; 524/186; 524/202; 524/366; 524/375; 524/376; 524/401; 524/436; 524/437; 524/500; 524/507; 524/590; 524/839; 524/840; 525/123; 525/455

(58) Field of Search ............... 524/13, 31, 35, 524/37, 42, 50, 51, 40, 32, 186, 202, 366, 375, 376, 401, 436, 437, 500, 507, 590, 839, 840; 525/123, 455

(56) References Cited

U.S. PATENT DOCUMENTS

| | | | |
|---|---|---|---|
| 3,158,494 | 11/1964 | Eikvar et al. | 117/45 |
| 4,371,582 | 2/1983 | Sugiyama et al. | 428/341 |
| 4,592,954 | 6/1986 | Malhotra | 428/335 |
| 4,992,414 | 2/1991 | Kishida et al. | 503/227 |
| 5,073,533 | 12/1991 | Aono | 503/227 |
| 5,075,153 | 12/1991 | Malhotra | 428/207 |
| 5,212,008 | 5/1993 | Malhotra et al. | 428/216 |
| 5,277,965 | 1/1994 | Malhotra | 428/216 |
| 5,523,273 | 6/1996 | McQuade | 503/227 |
| 5,567,507 | 10/1996 | Paff et al. | 428/213 |
| 5,663,023 | 9/1997 | Malhotra | 430/97 |
| 5,693,410 | 12/1997 | Malhotra et al. | 428/216 |
| 5,846,637 | 12/1998 | Malhotra et al. | 428/195 |
| 5,863,662 | 1/1999 | Hornby et al. | 428/483 |
| 5,908,723 | 6/1999 | Malhotra et al. | 428/31 |

FOREIGN PATENT DOCUMENTS

| | | |
|---|---|---|
| 0550876 | 7/1993 | (EP) . |
| 0812697 | 12/1997 | (EP) . |
| 0879708 | 11/1998 | (EP) . |
| 2147003 | 5/1985 | (GB) . |
| 9202041 | 8/1997 | (JP) . |

*Primary Examiner*—Patrick D. Niland
(74) *Attorney, Agent, or Firm*—Roger H. Criss

(57) ABSTRACT

An inkjet printing coating compositions and recording sheets having printable coating compositions on substrates which are suitable for photographic quality prints by inkjet printing technology, such as thermal and piezo. The recording sheet which comprises a substrate and a dried coating composition on the substrate, which coating composition comprises either (i) a hydrophilic or amphiphilic polyether polyurethane plus one or more polymers selected from the group consisting of cellulose ester polymers, cellulose ether polymers and vinyl polymers or (ii) cellulose acetate trimellitate plus optionally one or more polymers selected from the group consisting of cellulose ester polymers, cellulose ether polymers and vinyl polymers; a quaternary ammonium compound; a metal salt chelating agent; and a microcrystalline filler drying agent.

11 Claims, No Drawings

US 6,225,381 B1

PHOTOGRAPHIC QUALITY INKJET PRINTABLE COATING

BACKGROUND OF THE INVENTION

1. Field of the Invention

The present invention pertains to inkjet printing or more particularly to coating compositions and recording sheets composed of printable coating compositions on substrates which are useful for photographic quality prints by inkjet printing technology, such as thermal and piezo.

2. Description of the Related Art

Imaging techniques using inkjet printing systems are well known in the art. For example U.S. Pat. No. 4,592,954 describes basic inkjet printing techniques. U.S. Pat. No. 4,578,285 describes an inkjet printing method by ejecting ink droplets from a print head through one or more nozzles. Several schemes are utilized to control the deposition of the ink droplets to form desired characters and images. One method comprises deflecting electrically charged droplets by electrostatic means. Another method comprises the ejection of single droplets under the control of a piezoelectric device.

It has been a problem in the art to provide a recording sheet for inkjet printing which is receptive to inks, allows the ink to dry quickly without running or smearing, provides sharp image quality and has very good water and humidity resistance which deters curling. Many attempts have been made produce recording sheets for inkjet printing which have all of these properties simultaneously. In this regard U.S. Pat. No. 4,371,582 describes an inkjet recording sheet containing a basic latex polymer. U.S. Pat. No. 3,158,494 describes a polyurethane ink receptive surface. U.S. Pat. No. 5,693,410 describes an inkjet recording transparencies having two coatings, namely a heat dissipating, fire resistant coating in contact with a substrate and a second ink receiving coating layer on the first layer comprising a hydrophilic binder, an ink spreading agent, a cationic component, a light-fastness inducing agent, a filler and a biocide. JP Pat. 9,202,041 describes inkjet recording media which has good ink drying properties comprising a substrate provided with at least one ink receiving layer which contains a reaction product of polyalkylene oxide with an isocyanate and a water insoluble cellulose compound. While the above inkjet media are suitable for their intended purposes, there remains a need for a universal ink jet media for a dye based ink system as well as a pigment based ink system. Further, there is a need for a universal ink jet media useful for obtaining photographic quality prints by both thermal and piezo inkjet printing technologies. Additionally, there remains a need for coatings for inkjet media which have good water resistance which can counter media curl due to humidity changes.

The present invention provides inkjet printable coated media which overcome the above-noted disadvantages. The invention provides coating compositions, which when applied to suitable substrates such as transparent, translucent or opaque, white plastic films, paper or the like can achieve photographic quality prints by using any of a variety of inkjet printers. The coating composition is compatible with dye based and pigment based ink systems which can be printed both by thermal type inkjet printers and piezo type inkjet printers.

SUMMARY OF THE INVENTION

The invention provides a coating composition for producing recording sheet which comprises:

a) either (i) or (ii):
  (i) from about 10% to about 90% by weight of the composition of a hydrophilic or amphiphilic polyether polyurethane plus from about 5% to about 85% by weight of one or more polymers selected from the group consisting of cellulose ester polymers, cellulose ether polymers and vinyl polymers;
  (ii) from about 30% to about 90% by weight of cellulose acetate trimellitate plus from about 0% to about 50% by weight of one or more polymers selected from the group consisting of cellulose ester polymers, cellulose ether polymers and vinyl polymers;
b) from about 1% to about 8% by weight of a quaternary ammonium compound;
c) from about 0.05 to about 6% by weight of a metal salt;
d) from about 0.05 to about 6% by weight of a filler drying agent.

The invention also provides a recording sheet which comprises a substrate and a dried coating composition on the substrate, which coating composition comprises:

a) either (i) or (ii):
  (i) from about 10% to about 90% by weight of the composition of a hydrophilic or amphiphilic polyether polyurethane plus from about 5% to about 85% by weight of one or more polymers selected from the group consisting of cellulose ester polymers, cellulose ether polymers and vinyl polymers;
  (ii) from about 30% to about 90% by weight of cellulose acetate trimellitate plus from about 0% to about 50% by weight of one or more polymers selected from the group consisting of cellulose ester polymers, cellulose ether polymers and vinyl polymers;
b) from about 1% to about 8% by weight of a quaternary ammonium compound;
c) from about 0.05 to about 6% by weight of a metal salt;
d) from about 0.05 to about 6% by weight of a filler drying agent.

The invention further provides an imaged article which comprises the above recording sheet and a dry colored image on the recording sheet wherein the dry colored image is on the dried coating composition on the substrate.

The invention still further provides a process for producing an imaged article which comprises providing the above recording sheet and imaging the recording sheet by inkjet spraying and drying one or more colored inks onto the dried coating composition.

DETAILED DESCRIPTION OF THE PREFERRED EMBODIMENT

In the practice of the present invention, a composition is prepared which is composed of a) either (i) or (ii):
  (i) a hydrophilic or amphiphilic polyether polyurethane plus one or more polymers selected from the group consisting of cellulose ester polymers, cellulose ether polymers and vinyl polymers;
  (ii) cellulose acetate trimellitate plus optionally one or more polymers selected from the group consisting of cellulose ester polymers, cellulose ether polymers and vinyl polymers;
b) a quaternary ammonium compound;
c) a metal salt;
d) a filler drying agent.

A first embodiment of the invention comprises a hydrophilic or amphiphilic polyether polyurethane plus a cellulose ester polymer, a cellulose ether polymer or a vinyl polymer.

Suitable hydrophilic or amphiphilic polyether polyurethanes nonexclusively include hydroxy terminated polyether polyurethanes having carboxylate, silicone and/or carbonate functionalities. A preferred material is one which has both carboxylate and silicone functionalities or both carbonate and silicone functionalities which are available from Tindall Plains Hunter of New Jersey. The polyether polyurethane component is preferably present in an amount of from about 10% to about 90% by weight of the composition. A more preferred range is from about 30% to about 80% and most preferably from about 40% to about 70%.

The cellulose ester polymer, cellulose ether polymer or vinyl polymer aids in providing coating toughness and gloss. Preferred cellulosics are cellulose acetate, cellulose acetate phthalate, cellulose acetate propionate, cellulose acetate butyrate, hydroxypropyl methyl cellulose phthalate, hydroxy alkyl ($C_1$-$C_3$) cellulose, alkyl ($C_1$-$C_3$) cellulose, cellulose hydroxyalkyl phthalate, hydroxy propyl ethyl cellulose phthalate, hydroxypropyl methyl cellulose phthalate and mixtures thereof. Preferred vinyl polymers are polyvinyl pyrrolidone, styrenated polyvinyl pyrrolidone, polyvinyl pyrrolidone/polyvinyl acetate copolymer, polyvinyl alcohol and polyvinyl acetate, polyethylene oxide copolymers and mixtures thereof. In this first embodiment, the cellulose ester polymer, cellulose ether polymer or vinyl polymer component is preferably present in an amount of from about 5% to about 85% by weight of the composition. A more preferred range is from about 8% to about 50% and most preferably from about 20% to about 40%.

A second embodiment of the invention comprises cellulose acetate trimellitate plus an optional a cellulose ester, cellulose ether or vinyl polymer such as those described above. In this embodiment, the cellulose acetate trimellitate is preferably present in an amount of from about 30% to about 90% by weight of the composition. A more preferred range is from about 60% to about 90% and most preferably from about 75% to about 85%. In this embodiment the cellulose ester polymer, cellulose ether polymer or vinyl polymer component is optional and is preferably present in an amount of from about 0% to about 50% by weight of the composition. A more preferred range is from about 20% to about 50% and most preferably from about 15% to about 30%.

The composition also contains a quaternary ammonium compound as an ink fixing agent. Suitable quaternary ammonium compounds are polymers such as poly (diallyldimethylammonium halide), poly (diallylethylamine hydrochloride), poly (dialkyldiallyl ammonium halide), poly (dimethylmethyldiaryl ammonium chloride), poly (diallylmethylammonium phosphate) and mixtures thereof. It is preferably present in an amount of from about 1% about 8% by weight of the composition. A more preferred range is from about 1.5% to about 6% and most preferably from about 2% to about 4%.

The composition also contains a metal salt chelating agent as an ink fixing agent. Suitable metal salts include sodium, calcium, aluminum and magnesium sulfates and halides. It is preferably present in an amount of from about 0.05% to about 6% by weight of the composition. A more preferred range is from about 2% to about 6% and most preferably from about 3% to about 5%.

The composition also contains a filler dying agent such as a microcrystalline filler drying agent to improve ink drying time. Suitable filler drying agents include microcrystalline cellulose, amorphous silica, cellulose pulp, silica gel and alumina. It is preferably present in an amount of from about 0.05% to about 6% by weight of the composition. A more preferred range is from about 0.2% to about 2% and most preferably from about 0.5% to about 1%.

The composition also optionally contains a nonionic surfactant which aids in dot size control. Suitable nonionic surfactants include ethylene oxide-propylene oxide fatty alcohol non-ionic surfactants. The nonionic surface active agents useful in the present invention are characterized by the presence of an organic hydrophobic and an organic hydrophilic group and are typically produced by the condensation of an organic aliphatic or alkyl aromatic hydrophobic compound with ethylene oxide. The nonionic synthetic organic detergents employed in the practice of the invention may be any of a wide variety of such compounds, which are well known and, for example, are described at length in the text Surface Active Agents, Vol. 11, by Schwartz, Perry and Berch, published by Interscience Publishers and in McCutcheon's Detergents and Emulsifiers. Usually, the nonionic detergents are poly-lower alkoxylated lipophiles wherein the desired hydrophile-lipophile balance is obtained from addition of a hydrophilic poly-lower alkoxy group to a lipophilic moiety. The nonionic surfactant employed is preferably a polyethoxylated secondary higher alkanol wherein the secondary higher alkanol has 8 to 22 carbon atoms and wherein the number of moles of ethylene oxide is from 2 to 20 per mole of the secondary higher alcohol. A preferred class of useful nonionics are represented by the commercially well known class of nonionics which are the reaction product of a higher linear alcohol and a mixture of ethylene and propylene oxides, containing a mixed chain of ethylene oxide and propylene oxide, terminated by a hydroxyl group. Examples include the nonionics sold as FC-170C (from 3M) and those under the Plurafac trademark of BASF, such as Plurafac C-17, Plurafac RA30, Plurafac RA40 (a $C_{13}$–$C_{15}$ fatty alcohol condensed with 7 moles propylene oxide and 4 moles ethylene oxide), Plurafac D25 (a $C_{13}$–$C_{15}$ fatty alcohol condensed with 5 moles propylene oxide and 10 moles ethylene oxide), Plurafac B26, and Plurafac RA50 (a mixture of equal parts Plurafac D25 and Plurafac RA40). Generally, the mixed ethylene oxide-propylene oxide fatty alcohol condensation products represented by the general formula $RO(C_3H_6O)_p(C_2H_4O)_qH$ wherein R is a straight or branched primary or secondary aliphatic hydrocarbon, preferably alkyl or alkenyl, especially preferably alkyl, of from 6 to 20, preferably 10 to 18, especially preferably 12 to 18 carbon atoms, p is a number of up to 14, preferably 3 to 8, and q is a number of up to 14, preferably 3 to 12. The nonionic surfactant is preferably present in an amount of from about 0.05% to about 0.2% by weight of the composition. A more preferred range is from about 0.1% to about 0.75% and most preferably from about 0.4% to about 0.6%.

The coating composition is formed by mixing the ingredients in a solvent composition in an amount sufficient to form a substantially uniform dispersion of the coating composition components. Usually this ranges from about a 10% to 20% solution of the dry ingredients. Suitable the solvent composition components comprise water, a $C_1$ to $C_4$ alcohol or mixtures thereof.

Suitable substrates include transparent plastic films, translucent plastic films, opaque (usually white) plastic films, cloth, nonwoven fabrics, paper and combinations thereof. Plastic films may be polyethylene terephthalate, polyethylene, polypropylene, polyvinyl chloride, polycarbonate, nylon and polyolefin blends such as polyethylene/polypropylene blends and mixtures of the foregoing. Particularly preferred materials are those which have been surface treated by the manufacturers to promote adhesion. Suitable films nonexclusively include polyethylene terephthalate films available as Melinex 054, 504, 505, and 582 films from ICI. The surface may be treated with adhesion promoters such as a sizing which will increase the adhesion of the coating to the substrate surface.

Useful sizing layer materials can be acrylic polymer emulsions, or styrenated acrylic polymer emulsion from Johnson Wax Chemical Company as well as urethane/acrylic copolymers or urethane polymers available from Zeneca Resins. The thickness of the film is not critical but in most applications, the film thickness generally varies from about the substrate has a thickness of from about 0.05 mm to about 0.5 mm.

A coating layer is applied to the base material by any of those generally known in the art of film or paper coating. Examples include, slot die coating, gravure coating, roller coating, air knife coating, doctor blade coating or any other means by which substantially uniform application is achieved. Once the coating is applied, the film is permitted to dry by passing through heated ovens in a temperature ranging from 100° F. (38° C.) to 175° F.(79° C.). The thickness of the coating layer can vary over a wide range, although more favorable results in terms of ink reception are obtained as the thickness increases. The coating composition is applied to a suitable substrate and dried to a coating thickness of from about 0.5 micrometer to 50 micrometers. The coating may be applied as a single layer or as multiple layers. The coating of the present invention enables the rapid drying of inks selected for marking, and also allows for expedited absorption of these inks. Specifically these coated substrates are useful for forming images with commercially available printers based on either thermal or piezo technology, including wide format printers, and with inks comprising dyes as well as pigments. The coating of the present invention enables the absorption of water from water based inks in relatively short time periods, for example in one minute, and simultaneously maintaining the dye or pigment in the ink on the surface, thus allowing maximum optical density to be achieved in the dried image. The coating of the present invention prevents the inkjet media from curling under variable humidity change. In contrast, many commercially available coated inkjet media demonstrate severe corner curls as a function of humidity change. An imaged article may be prepared from the inventive recording sheet by applying a dry colored image onto the recording sheet. This may be done by inkjet spraying and drying one or more well known colored inks onto the dried coating composition in a manner well known to those skilled in the art.

The following examples are being supplied to further exemplify various species of the present invention, it being noted that these examples are intended to illustrative only and not intended to limit the scope of the present invention. Parts and percentages are by weight unless otherwise indicated.

EXAMPLE 1

The adhesion promoted surface of an opaque white polyethylene terephthalate substrate of about 100 μm thickness was coated with a coating composition comprising the following components:

| Ingredient | Amount (parts by weight) |
| --- | --- |
| Cellulose Acetate Trimellitate | 15 |
| Poly(diallyldimethyl ammonium chloride) | 5 |
| MgCl$_2$ | 1 |
| Microcrystalline cellulose | 0.5 |
| Water | 78.5 |

Two coatings were applied on the adhesion promoted surface of a polyethylene terephthalate substrate by gravure coating technique. The coated substrate was dried in the oven at a temperature ranging from 150° F. (65° C.) to 175° F. (79° C.) for 2 to 5 minutes to yield a ink receptive layer of approximately 12 μm thickness.

EXAMPLE 2

The adhesion promoted surface of an opaque white polyethylene terephthalate substrate of about 100 μm thickness was coated with a coating composition comprising the following components:

| Ingredient | Amount (parts by weight) |
| --- | --- |
| Cellulose Acetate Trimellitate | 10 |
| Hydroxypropyl cellulose | 5 |
| Poly(diallyldimethyl ammonium chloride) | 5 |
| MgCl$_2$ | 1 |
| Microcrystalline cellulose | 0.5 |
| Water | 78.5 |

Two coatings were applied on the adhesion promoted surface of polyethylene terephthalate substrate by gravure coating technique. The coated substrate was dried in the oven at a temperature ranging from 150° F. (65° C.) to 175° F. (79° C.) for 2 to 5 minutes to yield a ink receptive layer of approximately 12 μm thickness.

EXAMPLE 3

The adhesion promoted surface of an opaque white polyethylene terephthalate substrate of about 100 μm thickness was coated with a coating composition comprising the following components:

| Ingredient | Amount (parts by weight) |
| --- | --- |
| Hydrophilic polyether polyurethane | 10 |
| Poly(diallyldimethyl ammonium chloride) | 5 |
| MgCl$_2$ | 1 |
| Plurafac C-17 (non-ionic surfactant) | 0.1 |
| Microcrystalline cellulose | 0.5 |
| Methanol | 37.5 |
| Ethanol | 37.5 |
| Water | 8.4 |

A single coating was applied on the treated surface of the polyethylene terephthalate substrate by slot die coating techniques. The coated substrate was dried in an oven at a temperature ranging from 150° F.(65° C.) to 175° F. (79° C.) for 2 to 5 minutes to yield a ink receptive layer of approximately 12 μm thickness.

EXAMPLE 4

The adhesion promoted surface of an opaque white polyethylene terephthalate substrate of about 100 μm thickness was coated with a coating composition comprising the following components:

| Ingredient | Amount (parts by weight) |
| --- | --- |
| Hydrophilic polyether polyurethane | 5 |
| Cellulose acetate phthalate | 5 |
| Poly(diallyldimethyl ammonium chloride) | 5 |
| $MgCl_2$ | 1 |
| FC-170C (non-ionic surfactant) | 0.1 |
| Microcrystalline cellulose | 0.5 |
| Methanol | 37.5 |
| Ethanol | 37.5 |
| Water | 8.4 |

A single coating was applied on an adhesion promoted surface of a polyethylene terephthalate substrate by slot die coating techniques. The coated substrate was dried in the oven at a temperature ranging from 150° F. (65° C.) to 175° F. (79° C.) for 2 to 5 minutes to yield a ink receptive layer of approximately 12 μm thickness.

EXAMPLE 5

The adhesion promoted surface of an opaque white polyethylene terephthalate substrate of about 100 μm thickness was coated with a coating composition comprising the following components:

| Ingredient | Amount (parts by weight) |
| --- | --- |
| Hydrophilic polyether polyurethane | 5 |
| Hydroxypropyl methyl cellulose phthalate | 5 |
| Poly(diallyldimethyl ammonium chloride) | 5 |
| $MgCl_2$ | 1 |
| Plurafac C-17 (non-ionic surfactant) | 0.1 |
| Microcrystalline cellulose | .5 |
| Methanol | 37.5 |
| Ethanol | 37.5 |
| Water | 8.4 |

A single coating was applied on the treated surface of polyethylene terephthalate substrate by slot die coating techniques. The coated substrate was dried in an oven at a temperature ranging from 150° F. (65° C.) to 175° F. (79° C.) for 2 to 5 minutes to yield a ink receptive layer of approximately 12 μm thickness.

EXAMPLE 6

Each of the coated substrates produced according to Examples 1–2 were imaged in a thermal type printer using dye based inks and pigment based inks. Excellent near-photographic quality images were produced.

EXAMPLE 7

Each of the coated substrates produced according to Examples 3–5 were imaged in a thermal type printer and a piezo type printer using dye based inks and pigment based inks. Excellent near-photographic quality images were produced.

EXAMPLE 8 (COMPARATIVE)

The adhesion promoted surface of an opaque white polyethylene terephthalate substrate of about 100 μm thickness was coated with a coating composition comprising the following components:

| Ingredient | Amount (parts by weight) |
| --- | --- |
| Cellulose Acetate Trimellitate | 15 |
| Poly(diallyldimethyl ammonium chloride) | 5 |
| Microcrystalline cellulose | 0.5 |
| Metal salt | 0.0 |
| Water | 5 |
| Ethanol | 37.25 |
| Methanol | 37.25 |

When an attempt was made to image the substrate coated with above composition, the print quality was not acceptable, since there were cracks in the prints.

EXAMPLE 9 (COMPARATIVE)

The adhesion promoted surface of an opaque white polyethylene terephthalate substrate of about 100 μm thickness was coated with a coating composition comprising the following components:

| Ingredient | Amount (parts by weight) |
| --- | --- |
| Hydroxypropyl methyl cellulose phthalate | 10 |
| Polyether polyurethane | 0 |
| Poly(diallyldimethylammonium chloride) | 5 |
| Microcrystalline cellulose | 0.5 |
| $MgCl_2$ | 1 |
| Water | 5 |
| Ethanol | 39.25 |
| Methanol | 39.25 |

When an attempt was made to image the substrate coated with above composition, the print quality was not acceptable, since the drying time of prints was very slow and print quality was inferior.

The foregoing examples demonstrate that when the composition of the present invention is employed, excellent near-photographic quality images are produced.

While the present invention has been particularly shown and described with reference to preferred embodiments, it will be readily appreciated by those of ordinary skill in the art that various changes and modifications may be made without departing from the spirit and scope of the invention. It is intended that the claims be to interpreted to cover the disclosed embodiment, those alternatives which have been discussed above and all equivalents thereto.

What is claimed is:

1. A coating composition for producing recording sheet which comprises:
   a) either (i) or (ii):
      (i) from about 10% to about 90% by weight of the composition of a hydrophilic or amphiphilic polyether polyurethane plus from about 5% to about 85% by weight of one or more polymers selected from the group consisting of cellulose ester polymers, cellulose ether polymers and vinyl polymers;
      (ii) from about 30% to about 90% by weight of cellulose acetate trimellitate plus from about 0% to about 50% by weight of one or more polymers selected from the group consisting of cellulose ester polymers, cellulose ether polymers and vinyl polymers;

b) from about 1% to about 8% by weight of a quaternary ammonium compound;

c) from about 0.05 to about 6% by weight of a metal salt;

d) from about 0.05 to about 6% by weight of a filler drying agent.

2. The coating composition of claim 1 further comprising a solvent composition in an amount sufficient to form a substantially uniform dispersion of the coating composition components.

3. The coating composition of claim 2 wherein the solvent composition comprises water, a $C_1$ to $C_4$ alcohol or mixtures thereof.

4. The coating composition of claim 1 further comprising from about 0.05 to about 0.2% by weight of the composition of a non-ionic surfactant.

5. The coating composition of claim 1 further comprising from about 0.05 to about 0.2% by weight of the composition of a non-ionic surfactant and a solvent composition in an amount sufficient to form a substantially uniform dispersion of the coating composition components.

6. The composition of claim 1 further comprising from about 0.05 to about 0.2% by weight of the composition of an ethylene oxide-propylene oxide fatty alcohol non-ionic surfactant.

7. The composition of claim 1 which comprises a polyether polyurethane having carboxylate, silicon and carbonate functionalities.

8. The composition of claim 1 wherein the polymer is selected from the group consisting of cellulose acetate, cellulose acetate phthalate, cellulose acetate propionate, cellulose acetate butyrate, hydroxypropyl methyl cellulose phthalate, hydroxy alkyl ($C_1$–$C_3$) cellulose, alkyl ($C_1$–$C_3$) cellulose, cellulose hydroxyalkyl phthalate, hydroxy propyl ethyl cellulose phthalate, hydroxypropyl methyl cellulose phthalate, preferred vinyl polymers are polyvinyl pyrrolidone, styrenated polyvinyl pyrrolidone, polyvinyl pyrrolidone/polyvinyl acetate copolymer, polyvinyl alcohol and polyvinyl acetate, polyethylene oxide copolymer and mixtures thereof.

9. The composition of claim 1 wherein the quaternary ammonium compound polymer is selected from the group consisting of poly (diallyldimethylammonium halide), poly (diallylethylamine hydrochloride), poly (dialkyldiallyl ammonium halide), poly (dimethylmethyldiaryl ammonium chloride), poly (diallylmethylammonium phosphate) and mixtures thereof.

10. The composition of claim 1 wherein the metal salt is selected from the group consisting of sodium, calcium, aluminum and magnesium sulfates and halides.

11. The composition of claim 1 wherein the filler drying agent is selected from the group consisting of microcrystalline cellulose, amorphous silica, cellulose pulp, silica gel and alumina.

* * * * *